UNITED STATES PATENT OFFICE.

JAMES B. FORSYTH, OF ROXBURY, MASSACHUSETTS.

IMPROVEMENT IN RUBBER ROLLERS FOR WRINGING-MACHINES.

Specification forming part of Letters Patent No. 56,398, dated July 17, 1866.

*To all whom it may concern:*

Be it known that I, JAMES B. FORSYTH, of Roxbury, Norfolk county, and State of Massachusetts, have invented a new and useful Improvement in Curing Rollers for Clothes-Wringers, &c.; and I do hereby declare that the following is a full, clear, and exact description thereof, which will enable others skilled in the art to make and use the same, reference being had to the accompanying drawing, forming part of this specification.

This invention consists in curing a roller made of india-rubber or other vulcanizable gum on a hollow metallic core in such a manner that the heat is equally diffused throughout the entire mass of vulcanizable gum and the articles produced are of superior tenacity and toughness.

India-rubber rollers for clothes-wringers or other purposes are generally made by winding round a solid shaft sheets of rubber until the roller has attained the required thickness, and curing said roller on the shaft. In doing this the heat is not enabled to penetrate evenly throughout the entire mass of rubber, and particularly with rollers of great thickness the inner layers remain insufficiently vulcanized, rendering the roller liable to wear out in a short time. This difficulty I have obviated by curing such rollers on a hollow core, so that the heat is equally diffused throughout the entire mass of gum or rubber, and rollers can be provided which are evenly vulcanized throughout, and which are not liable to wear out for want of being properly vulcanized.

The hollow core, being retained in the rubber, I fit with a square or polygonal hole, so that it can be readily applied to a correspondingly square or polygonal shaft, and a firm connection between such shaft and the roller is effected.

What I claim as new, and desire to secure by Letters Patent, is—

Curing rollers of india-rubber or other vulcanizable gum on a hollow core, substantially as and for the purpose described.

The above specification of my invention signed by me this 18th day of December, 1865.

JAMES B. FORSYTH.

Witnesses:
M. M. LIVINGSTON,
C. L. E. TOPLIFF.